United States Patent

Stahler

[15] 3,666,201

[45] May 30, 1972

[54] CASSETTE FEEDING APPARATUS

[72] Inventor: Alfred F. Stahler, San Jose, Calif.

[73] Assignee: Ampex Corporation, Redwood City, Calif.

[22] Filed: Apr. 1, 1970

[21] Appl. No.: 24,760

[52] U.S. Cl. ................................242/180, 242/198, 274/4 F

[51] Int. Cl. .................G03b 1/04, G11b 15/32, G11b 23/04

[58] Field of Search .........................242/180–185, 197–200; 274/4 F

[56] References Cited

UNITED STATES PATENTS

| | | | |
|---|---|---|---|
| 2,941,738 | 6/1960 | Burke et al. | 242/181 |
| 3,004,729 | 10/1961 | Barkhuff | 242/200 |

*Primary Examiner*—Leonard D. Christian
*Attorney*—Robert G. Clay

[57] ABSTRACT

For use with a magnetic tape transport of the type in which a pair of vacuum tape loop storage columns are arranged on either side of a vacuum tape metering capstan and transducing means, and tape is drawn into the storage columns and against the capstan and transducing means from a magnetic tape cassette, an array of cassettes is arranged for movement parallel to the tape pack axes thereof for delivery of any selected cassette to an insertion-withdrawal means that then moves the selected cassette in a plane normal to the tape pack axes and into operative relationship with the tape transport. Means are provided to cause the cassette to engage a precision positioning wall on the transport, and extension means are arranged to extend for centering and driving the tape pack hubs of the cassette. The hubs are formed with springloaded portions engageable with the cassette side walls for braking the hubs when the cassette is not in operating relation with the transport, and the extension means also engages and releases these braking portions to free the hubs for operation. A cover door is provided for the transport and a reel-to-reel arrangement is also provided for operation with a suitable dummy cassette in the transport.

8 Claims, 6 Drawing Figures

INVENTOR.
ALFRED F. STAHLER

BY

Robert G. Clay

ATTORNEY

INVENTOR.
ALFRED F. STAHLER

BY Robert G. Clay

ATTORNEY

INVENTOR
ALFRED F. STAHLER
BY Robert S. Clay
ATTORNEY

INVENTOR.
ALFRED F. STAHLER

BY Robert G. Clay

ATTORNEY

CASSETTE FEEDING APPARATUS

BACKGROUND OF THE INVENTION

The present invention relates to magnetic tape transports and particularly to automatic cassette feeding apparatus therefor.

In co-pending U.S. Pat. application Ser. No. 809,759 filed Mar. 24, 1969 entitled "Automatically Threading Tape Transport" by Alfred F. Stahler, there is disclosed an automatically operating magnetic tape transport, particularly for television, but suitable in general form for other uses also, of the type in which a pair of vacuum tape loop storage columns draw a loop of tape from a cassette and into operating relation with the columns and with a vacuum type capstan and transducing means. The present invention relates to automatic feeding of an array of cassettes one-by-one to such a transport, with a simplicity and economy not previously attained in the art, and to various associated improvements, including precision positioning and driving of the tape pack hubs of the cassette independently of dimensional variations that may be found from one cassette to another, to an automatic brake that stops rotation of the hubs when the cassette is removed from the transport, to provision for alternative use of reel-to-reel tape supply for the transport, and to improvements in the constructions of the transport and feeding means in their common cabinet.

Accordingly, it is an object of the present invention to provide improved automatic cassette feeding apparatus for a magnetic tape transport.

It is another object to provide precision positioning means for the tape pack hubs of the cassette in operation with the transport.

It is a further object to provide braking means for preventing unreeling of the tape from the cassette when the cassette is removed from the transport, and brake relieving means therefor.

It is a still further object to provide for alternative reel-to-reel operation of a transport having the above mentioned cassette feeding, positioning and brake relieving means associated therewith.

SUMMARY OF THE INVENTION

For use with a magnetic tape transport of the type in which a pair of vacuum tape loop storage columns are arranged on either side of a vacuum tape metering capstan and transducing means, and tape is drawn into the storage columns and against the capstan and transducing means from a magnetic tape cassette, an array of cassettes is arranged for movement parallel to the tape pack axes thereof for delivery of any selected cassette to an insertion-withdrawal means that then moves the selected cassette in a plane normal to the tape pack axes and into operative relationship with the tape transport. Means are provided to cause the cassette to engage a precision positioning wall on the transport, and extension means are arranged to extend for centering and driving the tape pack hubs of the cassette. The hubs are formed with springloaded portions engageable with the cassette side walls for braking the hubs when the cassette is not in operating relation with the transport, and the extension means also engages and releases these braking portions to free the hubs for operation. A cover door is provided for the transport and a reel-to-reel arrangement is also provided for operation with a suitable dummy cassette in the transport.

DETAILED DESCRIPTION

Figure 1:
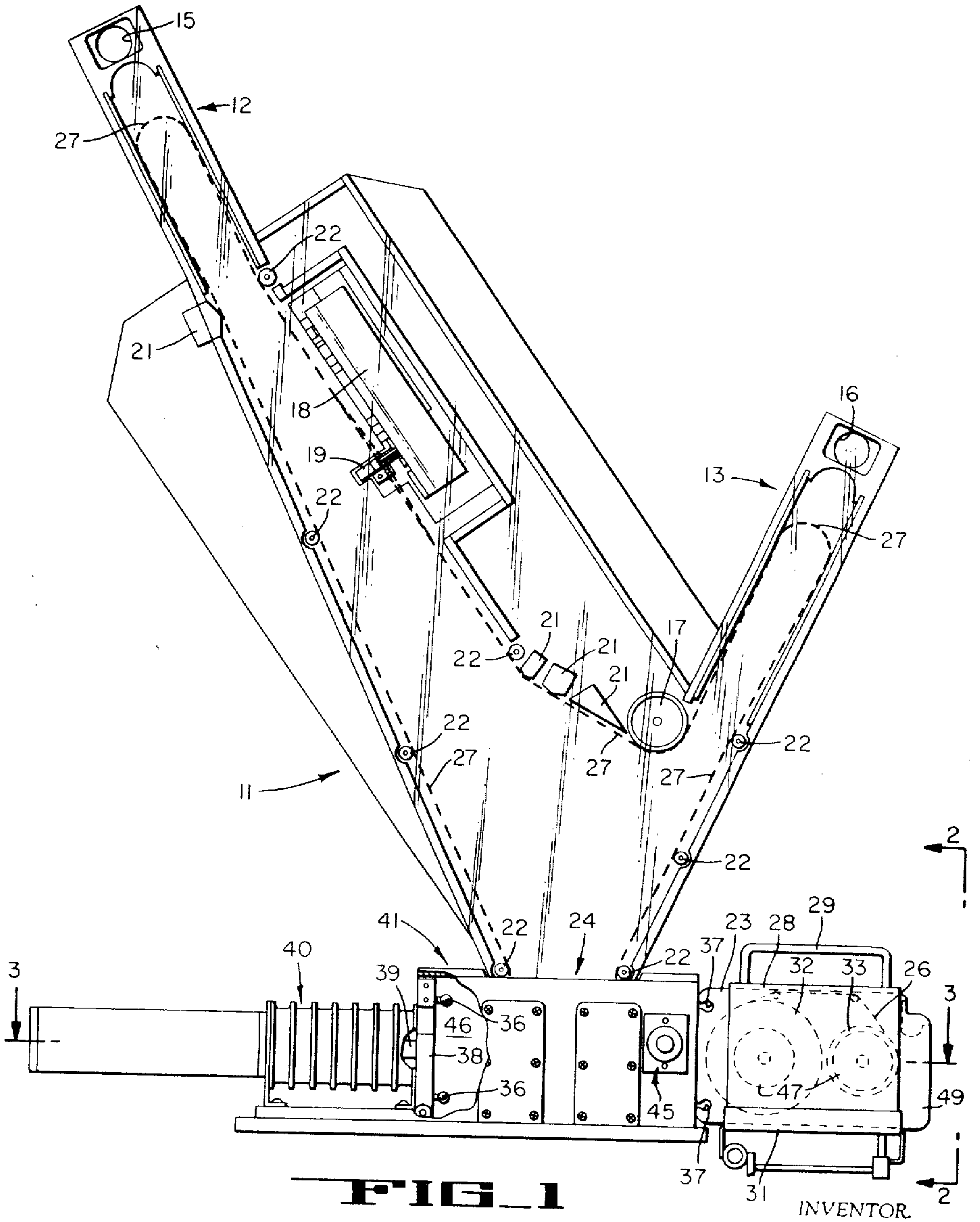
FIG. 1 is a side elevation view of a portion of a magnetic tape transport and cassette feeding apparatus in accordance with the invention.

FIG. 1 shows a magnetic tape transport 11 similar to the one disclosed in co-pending U.S. Pat. application Ser. No. 809,759, previously mentioned. In this transport, there are provided a pair of vacuum type tape loop storage columns 12, 13 having vacuum ports 15, 16, respectively, that communicate with a vacuum source, not shown. Also provided is a vacuum capstan 17, a rotary television head assembly 18 with a retractable female guide 19, and various longitudinal heads 21 and air bearing guides 22. In operation, a cassette 23 is positioned at the opening 24 of the transport, and a loop of tape 26 is drawn into the transport by the action of the vacuum, and assumes an operating path illustrated by the dashed line 27.

Figure 2:
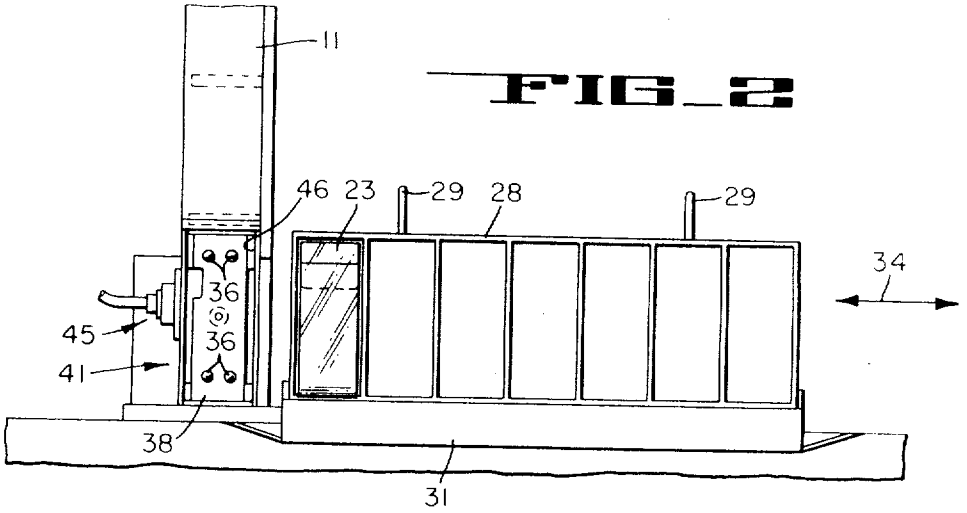
FIG. 2 is a front elevation view, partly broken away, taken on the plane of lines 2—2 of FIG. 1.
Figure 3:
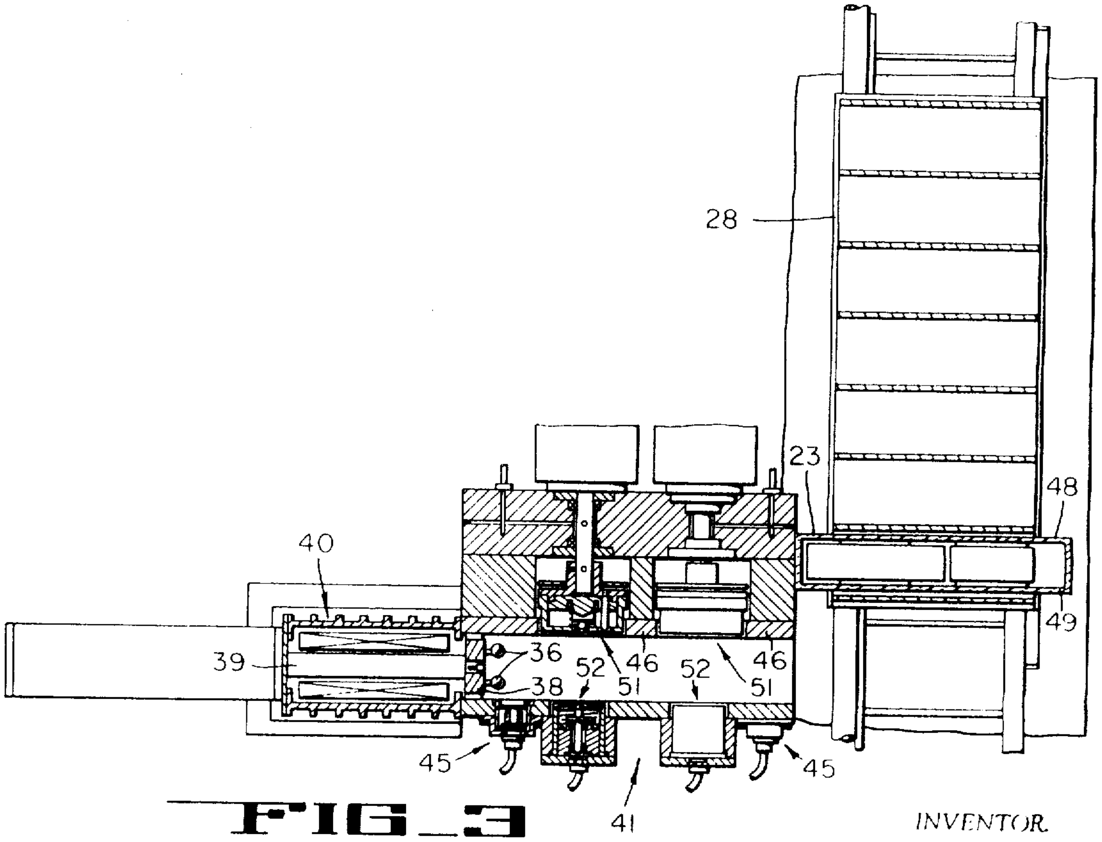
FIG. 3 is a plan cross-section taken on the plane of lines 3—3 of FIG. 1.

To automatically feed an array of cassettes one-by-one and selectively to the transport, there is provided a magazine assembly 28 (FIGS. 1–3), having handles 29 to facilitate hand loading and unloading of the magazine on a sliding tray 31. Mechanism, not shown, may be provided to move the tray and magazine in a direction parallel to the axes of the cassette tape packs 32, 33, as shown by the arrow 34 (FIG. 2).

Arriving at the plane of the transport 11, the selected cassette is engaged by two pairs of key elements 36 which fit into a pair of keyway grooves 37 in the cassette, and are mounted on a plate 38 on the end of a reciprocating rod 39 forming the armature of a linear motor 40 for automatic insertion and withdrawal of the cassette into and from a cassette holding means 41 attached to the transport.

For clarity's sake, the rod 39 with keys 36 is shown in the position it would occupy while holding a cassette in the holding means 41, but with no cassette therein. It will be understood, however, that normally with the rod in this position there will be a cassette in the holding means, and that if there is no cassette in the holding means, the rod will be fully extended so that movement of the magazine 26 in the direction of arrow 34 causes each cassette in turn to momentarily engage the keys 36 with its keyways 37, and when the magazine is stopped with the next selected cassette in the plane of the transport, the newly selected cassette is already engaged with the insertion keys 36 and is ready for insertion in the holding means 41.

The provision of four keys 36 assures the substantially correct alignment of the cassette in the plane of the transport, as well as substantially correct positioning with respect to X, Y axes in the transport plane. However, for more precise positioning of the tape packs as is required for proper operation of the transport, the following additional measures are taken. First the cassette is urged by means 45 against a precision positioning wall 46; second, the tape pack hubs 47 are arranged to be only loosely journalled in the side walls 48, 49 of the cassette in their operative position, and can therefore be positioned and aligned with extreme precision independently of dimensional or positional inaccuracy in the cassette; and third, extension means 51, 52 are provided to engage the hubs to effect the precision positioning desired. As will be seen, the means 51, 52 also perform the functions of driving the hubs in operational rotation, and of releasing an automatic braking arrangement that is built into the hubs to lock them against rotation and the spilling of tape when the cassette is removed from the transport.

Figure 4:
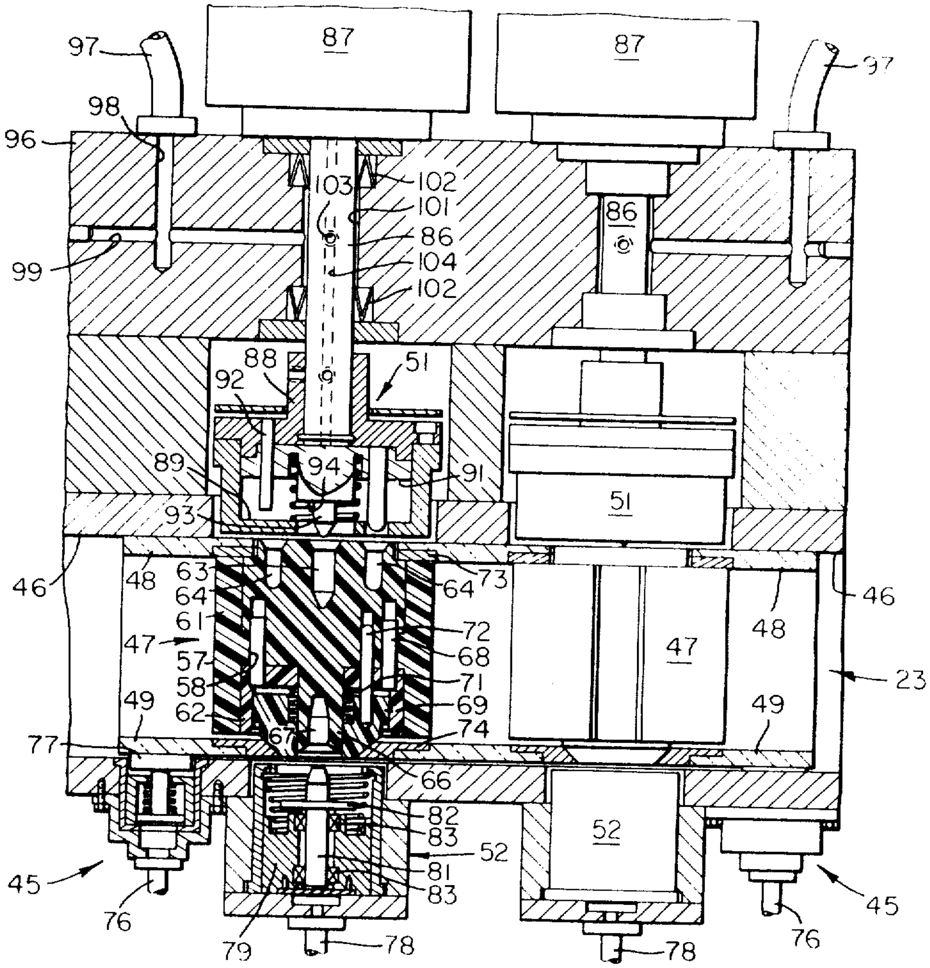
FIG. 4 is an enlarged plan cross-section of a portion of the structure of FIG. 3.

As shown more clearly in FIG. 4, the hub 47 is formed with an outer disposable sleeve 57, which supports the tape pack, and which may be removed with the tape pack when it is desired to change tapes, so as to save the expense of providing more than two of the more complex assemblies (described below) per cassette. The sleeve 57 has an interior centered flange 58, which fits against shoulders formed on a pair of interfitting hub assembly elements 61 and 62. The element 61 has a centering bore 63 and a plurality of driving keyway bores 64 arranged in a circle thereabout, and also an axial shaft 66 extending in the other direction and containing a centering bore 67. The element 62 is formed as a cup-shaped member and has a central opening which fits slidingly on the shaft 66. The two elements 61, 62 are held together by fastening elements 68, but may be pulled apart to release and dismount the sleeve 57 and associated tape pack.

The hub brake previously mentioned is provided by means of a brake element 69 fitting within the cupped portion of element 62 and sliding on the shaft 66, urged in an outward axial direction by a helical compression spring 71. The brake element 69 is retained against rotation with respect to the hub by means of a key pin 72 that fits slidingly in conforming bores in hub elements 61 and 62. The spring 71 urges the elements 69 and 61 apart and causes element 61 together with the associated end of sleeve 57 to brakingly engage a frictional inset 73 in the wall 48 of the cassette, while element 69 frictionally engages an inset 74 in the wall 49 of the cassette. Element 69 and inset 74 have mating conical faces defining a combination thrust and journal bearing. However, it will be seen that pushing the elements 69 and 61 together so as to further compress the spring 71 has the double effect of releasing the braking engagement of both ends of the hub and of causing both hub ends to be only loosely journalled in the cassette so as to be all the more freely precision positioned by the extension means 51, 52.

Each means 45 has a compressed air conduit 76 by which air under pressure is admitted to operate a springloaded piston 77 for pushing the cassette against the precision positioning wall 46.

Each means 52 is similarly provided with a conduit 78 by which air under pressure is admitted to operate a springloaded piston 79. A centering pin 81 and flange 82 is centrally mounted in the piston 79 as by means of a pair of ball bearing races 83, whichpermit rotation of the pin and flange as the hub 47 of the cassette is rotated during operation. When the piston 79 is operated, the tip of pin 81 enters the bore 67 for centering the hub, while the flange 82 pushes against the end of brake element 69 and backs it away from inset 74 so as to release the brake.

Each element 51 is mounted on a drive shaft 86 driven by a motor 87. The element 51 includes a disc 88 and a hollow cup-shaped element 89 mounted thereon to form a housing for an axially slidable springloaded piston 91, which is keyed for rotation with the disc 88 and drive shaft as by means of a pin 92 extending from the disc 88 and through the piston 91. The piston 91 also has a keying pin extending therefrom and through the housing element 89 to enter any of the keyway bores 64 when the piston is operated; and the piston also has a central centering pin 93 and flange 94 which extend through a suitable opening in housing element 89 to enter the centering bore 63 and push the hub element 61 away from frictional contact with inset 73 to release the brake at this end of the hub also. To operate the piston 91, the journalling member 96 is provided with conduits 97 and bores 89, 99 by which compressed air is admitted to a manifold bore 101 surrounding the shaft 86 and sealed by seals 102. The shaft 86 has a radial passage 103 communicating from the manifold 101 and with an axial bore 104 in the shaft. The bore 104 opens on the back side of the piston 91 and admits the compressed air to operate the piston.

Figure 5:
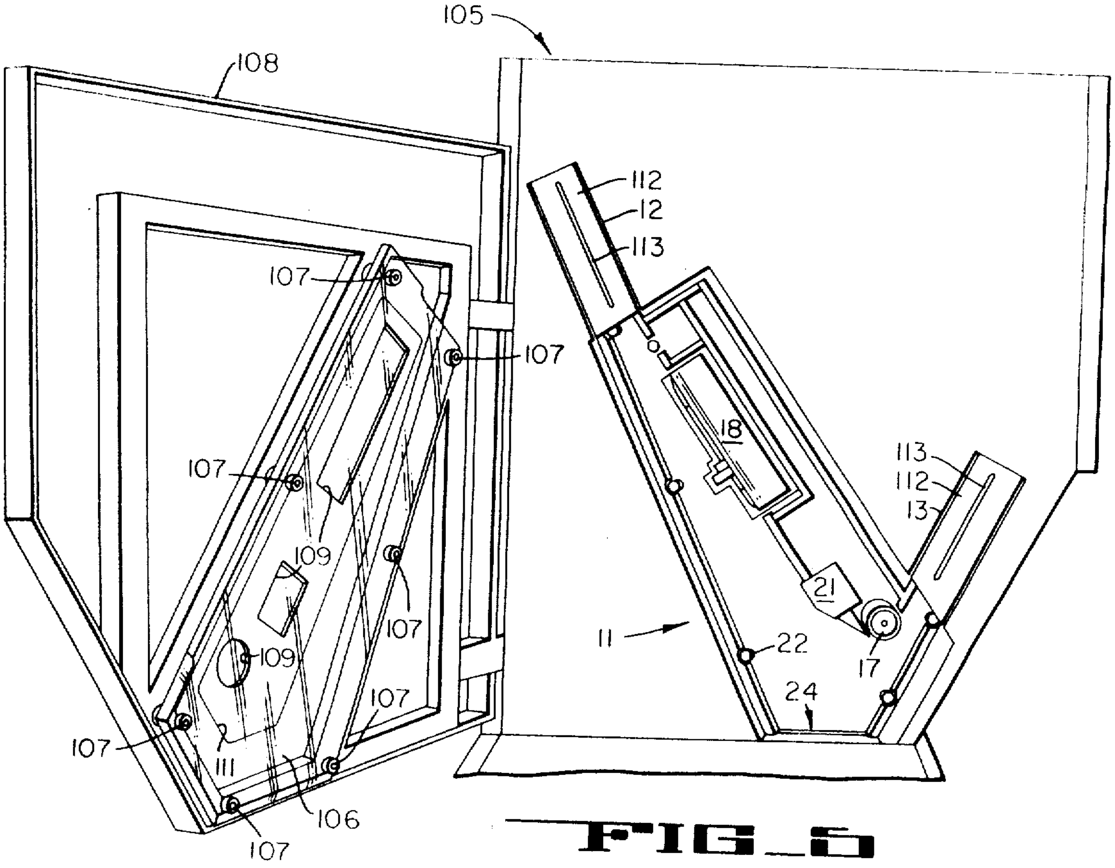
FIG. 5 is a reduced-scale broken-away perspective view of a portion of the apparatus of FIG. 1 in its cabinet, showing the operation of the cover doors.

FIG. 5 shows a portion of the outer cabinet 105 for the apparatus of the invention, also shown in further detail in copending design U.S. Pat. application D-22,147 entitled "Cassette Feeding Apparatus" filed Apr. 1, 1970, by Darrell S. Staley. In this arrangement, the transport 11 is covered during operation by a transparent cover plate 106, which is held in hermetically sealed relation to the transport as by means of springloaded pins 107 by which the cover plate is mounted on the inner side of a cabinet door 108. Clearance recesses 109 are cut in the plate 106 to accommodate portions of the transport heads 18 and 21 and the capstan 17. The cabinet door 108 also has a transparent inset window portion 111 through which operation of the transport may be viewed when the door is closed. When the door is open and tape is in the transport, a pair of cover plates 112 with tape loop viewing slit windows 113 cover the vacuum tape loop storage columns in order to preserve the vacuum therein and prevent the tape loops from dropping out. Thus, the cover plate 106 needs to be in closed position only at the moment when a newly selected cassette is brought into the holding means and the tape therefrom is drawn into the transport by the vacuum effect of the storage columns 12, 13.

Figure 6:
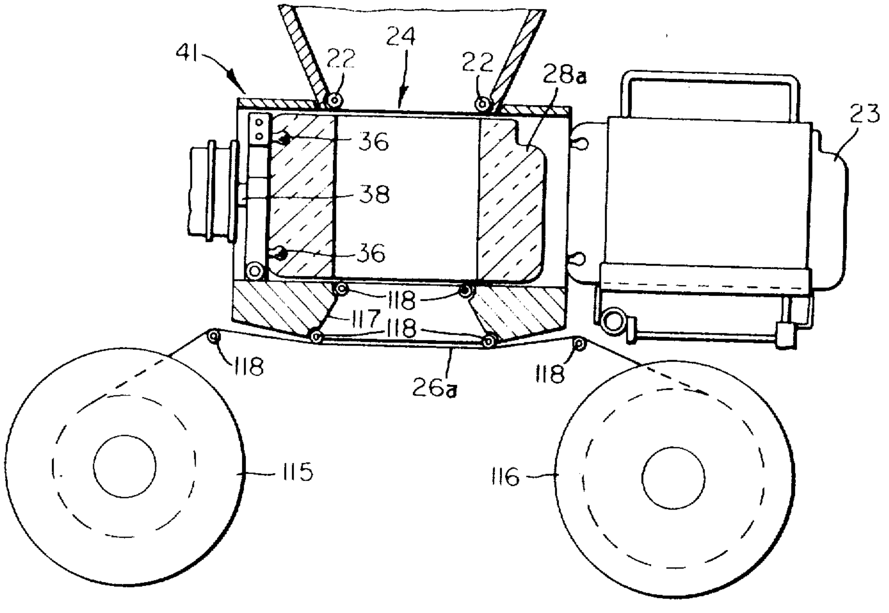
FIG. 6 is a schematic view of an alternative arrangement of the structure of FIG. 1.

The manner in which the tape is drawn into the transport is more fully described in the previously mentioned co-pending application Ser. No. 809,759. It will be understood however that a condition for successful threading is that the tape in the run between the tape packs of the cassette must be positioned in substantial (though not necessarily perfect) vacuum sealing relation across the mouth 24 of the transport tape inlet. It follows therefore, that if it is desired to adapt the transport with cassette feeding mechanism to reel-to-reel operation, as illustrated in FIG. 6, some special arrangements must be made in view of the fact that the cassette holding means 41 magazine 28 and tray 31 are awkwardly in the way of the run of tape **26*a* between the reels 115 and 116, and of the reel 116 itself. As shown in the Figure, this problem is overcome by providing the holding means 41 with a bottom opening 117, across which the tape run 26*a* is stretched as by means of air lubricated guides 118. To help seal the ends of the holding means 41, a dummy cassette 28*a* is provided, and is drawn into the holding means 41 by the rod 38 and keys 36 whenever reel-to-reel operation is desired. The dummy cassette 28*a* has a hollow passageway 119** for passage of the tape loop when it is drawn upward by the vacuum effect. The minor amount of air that may leak in through the clearance spaces around the dummy cassette is not sufficient to deleteriously affect the threading operation.

What is claimed is:

1. A cassette feeding apparatus for a magnetic tape transport, comprising:
   - means on said transport for holding one of said cassettes in operating relationship with said transport;
   - means associated with said holding means for engagement with said one cassette to drive the tape thereof;
   - means for moving said one cassette in a first plane normal to the axes of said tape packs thereof for insertion and withdrawal of said one cassette into and from said holding means;
   - means for mounting an array of said cassettes and for moving said arrayed cassettes in a second plane that is normal to said first plane for delivery to and removal from said insertion-withdrawal means;
   - said array-mounting means being arranged to move said array in reciprocating fashion in a direction parallel to said tape pack axes within said second plane;
   - said insertion-withdrawal means including a reciprocating rod and means for moving said rod in a path normal to said tape pack axes and lying in the plane thereof;
   - said rod having at least one key element mounted on the end thereof confronting said one cassette for engaging a conforming keyway in said one cassette and for drawing said one cassette along said rod path to said cassette holding means; and
   - said keyway being arranged as a groove parallel to said tape pack axes and extending fully across said one cassette so that said one cassette may be engaged and disengaged from said key element by movement of said one cassette parallel to said tape pack axes.

2. A cassette feeding apparatus as described in claim 1, wherein:
   - two of said keyways are provided in each cassette, and four key elements are provided on said rod, two keys for each keyway.

3. A cassette feeding apparatus as described in claim 1, wherein:

said cassette holding means is provided with a precision positioning wall lying in a plane normal to said tape pack axes, and means for engaging said one cassette upon entrance thereof into said holding means for pushing said one cassette firmly against said precision wall for operative positioning of said one cassette.

4. A cassette feeding apparatus as described in claim 3, wherein:

said tape packs of said cassettes are mounted on loosely journalled hubs in said cassettes; and means are provided as part of said holding means for extension therefrom into centering and keying recesses in said hubs for centering, positioning and driving said hubs independently of the body and walls of said cassette.

5. A cassette feeding apparatus as described in claim 4, wherein:

said hubs are arranged for endwise braking engagement with the cassette walls when said cassette is in said array; and said extension centering, positioning and driving means are also arranged to engage the ends of said hubs and to position said ends out of contact with said cassette walls so as to permit unbraked rotation of said hubs.

6. A cassette feeding apparatus as described in claim 1, wherein:

said tape transport is of the type including tape transducing and metering means, and differential air pressure means for drawing a loop of tape from said one cassette in said operative relationship and positioning said loop in said transport in transducing and metering relationship with the transducing and metering means thereof; and said transport also has a pair of tape reels with tape mounted thereon and stretched in a run therebetween for reel-to-reel operation, said reels being positioned to expose said run of tape to said differential air pressure means when none of said cassettes are in said cassette holding means.

7. A cassette feeding apparatus as described in claim 6, wherein:

said reels are positioned and guide means are provided to expose said run of tape to a suitable opening formed in said cassette holding means on the side thereof directly opposite said transport differential air pressure means; and a dummy cassette is provided in said array, said dummy cassette being of exterior shape similar to said tape cassettes, but being without tape and having a passage formed therethrough for the passage of a loop of said reel-mounted tape through said opening in said cassette holding means and to said differential air pressure means and said transducing and metering means when said dummy cassette is in said cassette holding means.

8. A cassette feeding apparatus as described in claim 1, wherein:

said tape transport is of the type including tape transducing and metering means, and differential air pressure means for drawing a loop of tape from said one cassette in said operative relationship and positioning said loop in said transport in transducing and metering relationship with the transducing and metering means thereof;

said transport is mounted in a cabinet, both said transport and said cabinet having superimposed cover doors that are at least in part transparent to permit viewing of said transducing and metering means when said cover doors are closed;

said transport cover door being in hermetically sealed relation with said transport when said transport cover door is closed, to aid the functioning of said differential air pressure means; and said transport cover door being mounted in springloaded relation with said cabinet cover door so that both doors are opened and closed as an assembly for access to said transport, and so that when closed, said transport cover door is held in springloaded hermetically sealed relation with said transport.

* * * * *